Dec. 9, 1958 W. G. SEARLES 2,863,275
CORN PICKER
Filed Dec. 29, 1955 2 Sheets-Sheet 2
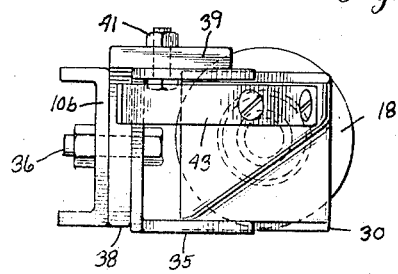
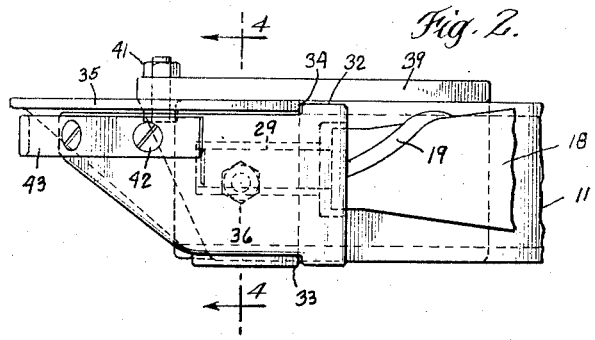
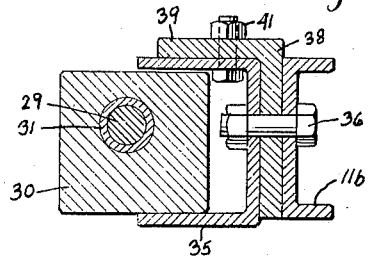
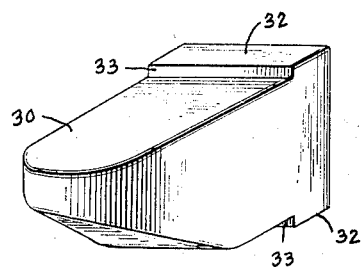
INVENTOR
William G. Searles
Joseph Allen Brown
ATTORNEY

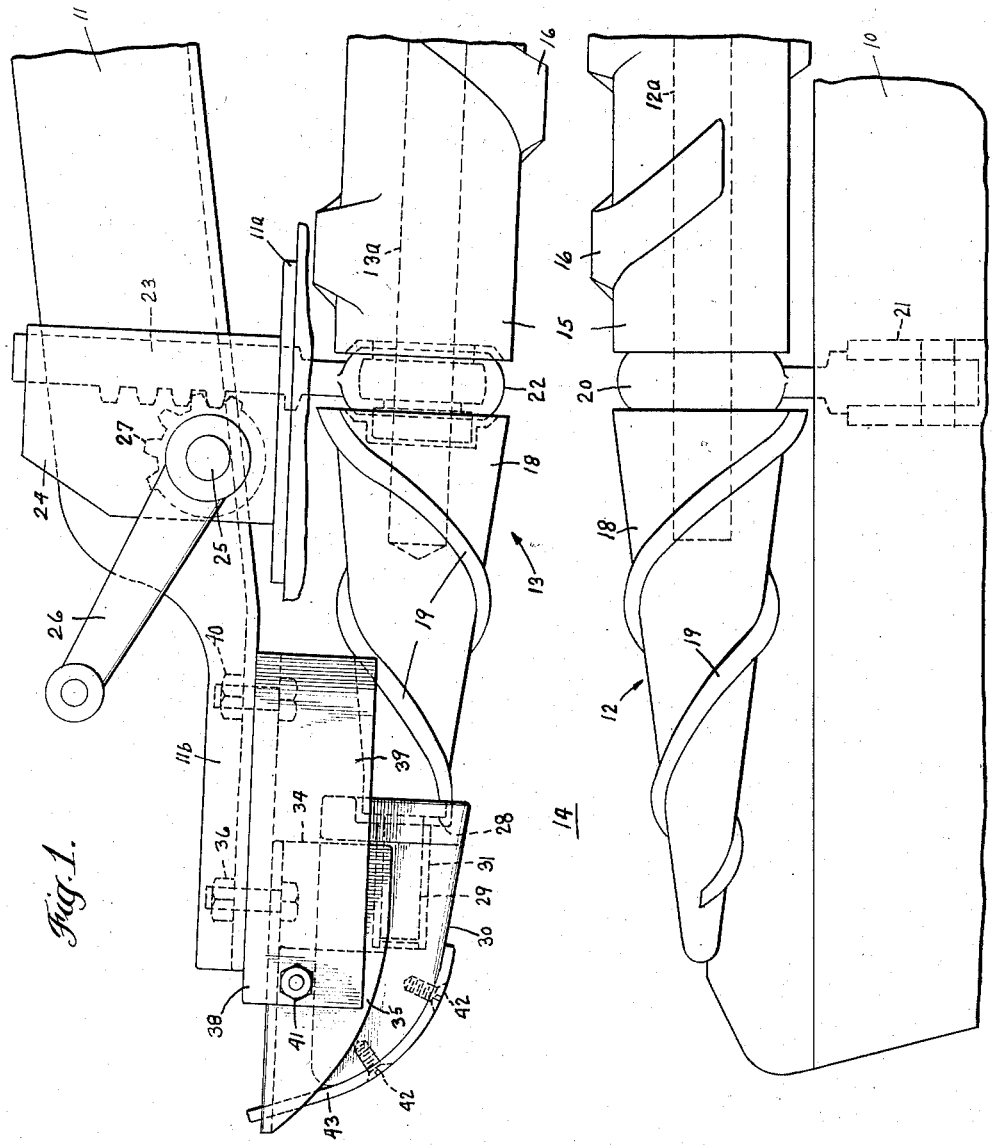

United States Patent Office 2,863,275
Patented Dec. 9, 1958

2,863,275

CORN PICKER

William G. Searles, New Holland, Pa., assignor to Sperry Rand Corporation, New Holland, Pa., a corporation of Delaware Application December 29, 1955, Serial No. 556,180

3 Claims. (Cl. 56—112)

The present invention relates generally to corn harvesters and more particularly to a corn picker of the type having a pair of snapping rolls one of which is adjustable laterally relative to the other roll.

One object of this invention is to provide improved guard means for the point of the adjustable snapping roll to prevent trash material from passing on the wrong side of the roll point and wrapping itself around the roll point.

Another object of this invention is to provide a novel mounting for the guard means so that when the adjustable snapping roll is adjusted, the guard means is simultaneously adjusted.

Further objects of this invention are to provide guard means of the character described which is of simple, effective and inexpensive construction.

Other objects of this invention will be apparent hereinafter from the specification and from the recital in the appended claims.

In the drawings:

Fig. 1 is a fragmentary plan view of the inlet portion of a corn picker and illustrating an improved guard means for the adjustable roll constructed according to one embodiment of this invention;

Fig. 2 is a fragmentary side view of the adjustable roll and its associated guard means;

Fig. 3 is an end view of the roll and guard means looking from the left of Fig. 2;

Fig. 4 is a section taken on the line 4—4 of Fig. 2 looking in the direction of the arrows; and Fig. 5 is a perspective view of a part of the guard means.

Referring now to the drawings by numerals of reference, and particularly to Fig. 1, the part of the picker frame shown comprises two spaced frame members 10 and 11, each of which carries a snapping or picker roll, 12 and 13, respectively. Rolls 12 and 13 define between them an inlet or throat 14 for the reception of corn stalks. Roll 12 is rotatable about the axis of a shaft 12a. Roll 13 is adjustable toward and away from roll 12 and is rotatable about the axis of shaft 13a. The rolls are rotated in opposite directions through conventional means, not shown, to produce a feeding action therebetween. Both rolls are essentially of the same configuration, comprising an upper cylindrical section 15 having peripheral picker teeth 16 and a lower conical section or point 18 having spiral ribs 19. Ribs 19 act to feed the stalks of corn inwardly between the cylindrical upper sections 15 of the rolls where the ears of corn are snapped from the stalks through the action of teeth 16.

Roll 12 is supported adjacent its lower end by a bearing 20 interposed between upper section 15 and lower section 18. Bearing 20 is connected through bracket means 21, of conventional structure, to frame member 10.

Adjustable roll 13 is supported adjacent its lower end by a bearing 22, similar to bearing 20, and interposed between the upper and lower sections of the roll.

Connected to bearing 22 is a rack 23 slideably supported in a bracket 24 welded or otherwise secured to frame member 11. Rack 23 extends through a section 11a of frame member 11, a fragmentary portion of which is shown (Fig. 1).

Suitably journaled in bracket 24 is a shaft 25 which carries a gear segment 27 meshing with rack 23. Fixedly connected to shaft 25 is a handle 26. It will be readily apparent from Fig. 1 that by manipulation of handle 26, roll 13 can be adjusted toward or away from roll 12.

The guard means of this invention is associated with the lower end of section or point 18 of adjustable roll 13. Such means will now be described.

The lower end of conical portion or point 18 of adjustable roll 13 is flattened off at 28; and, projecting downwardly from portion 18 is a stud-shaft 29. Stud-shaft 29 projects into a guard 30 having a bushing or bearing 31 which surrounds the shaft.

As shown best in Figs. 2 and 5, guard 30 is provided with laterally projecting wings 32 at its upper end. Wings 32 form shoulders 33 adapted to slide on tracks 34 (Figs. 1 and 2) form on a fixed guard 35 in which and on which guard 30 is slideable. Guard 35 is U-shaped in cross section; and it is rigidly affixed by nut and bolt means 36 to a lower portion 11b of frame member 11. Positioned between bracket 35 and portion 11b is an angle iron 38 one side wall 39 of which provides an additional fixed guard for closing off the space between the lower end of roll 13 and the lower end portion 11b of frame member 11. Angle iron 38 is suitably fastened to portion 11b by means including nut-bolt means 36. Nut and bolt means 41 is used to further connect guard 35 and angle iron 38 to thereby provide a rigid connection between the parts.

Fastened to guard 30 by screws 42 is a protective strip 43 which saves the guard from undue wear. When strip 43 becomes worn, it can be quickly and easily replaced.

When roll 13 is adjusted laterally relative to roll 12 by rotation of handle 26, guard 30 moves with it, the shoulders 33 sliding along the top or tracks 34 on fixed guard 35. The parallel sides of the fixed guide guard 30 in its movements and prevent guard 30 from rotating with roll 13. The relative position of guard 30 with respect to snapping roll 13 always remains the same. The movable and fixed guards 30 and 35, respectively, cooperate to prevent the entry of trash between roll 13 and the adjacent picker frame structure regardless of the position of adjustment of the roll. Unlike conventional guard means, which is affixed to the picker frame, the effectiveness of guards 30 and 35 is not lost or reduced on adjustment of roll 13 away from frame member 11 since the guard moves with the roll.

While the invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. In a corn picker, a frame, a snapping roll rotatably mounted on said frame, a point at one end of said roll and spaced from said frame, means carried on said frame and connected to said roll for laterally adjusting the roll whereby said point is moved toward or away from said frame and the space between the point and frame is varied, and means for closing off said space regardless of the position of adjustment of said roll to prevent the entry of material into said space comprising a pair of cooperative, overlapping guard members, means fixedly connecting one of said guard members to said frame, means connecting the other of said guard members to said point for movement therewith, said movable guard member being slidably supported on said fixed guard member.

2. In a corn picker, means for closing off said space as recited in claim 1 wherein said roll point is journalled in said movable guard, said fixed guard is U-shaped in cross section and provides spaced sides, said movable guard extending between said sides and its configuration being such that it is prevented from rotating by said sides.

3. In a corn picker, guard means as recited in claim 2 wherein said movable guard has laterally projecting wings slidable on said fixed guard.

References Cited in the file of this patent

UNITED STATES PATENTS

| | | |
|---|---|---|
| 1,160,777 | Small | Nov. 16, 1915 |
| 1,731,435 | Paradise | Oct. 15, 1929 |
| 1,945,364 | Coultas | Jan. 30, 1934 |
| 2,490,715 | Shrader | Dec. 6, 1949 |